Figure 1:
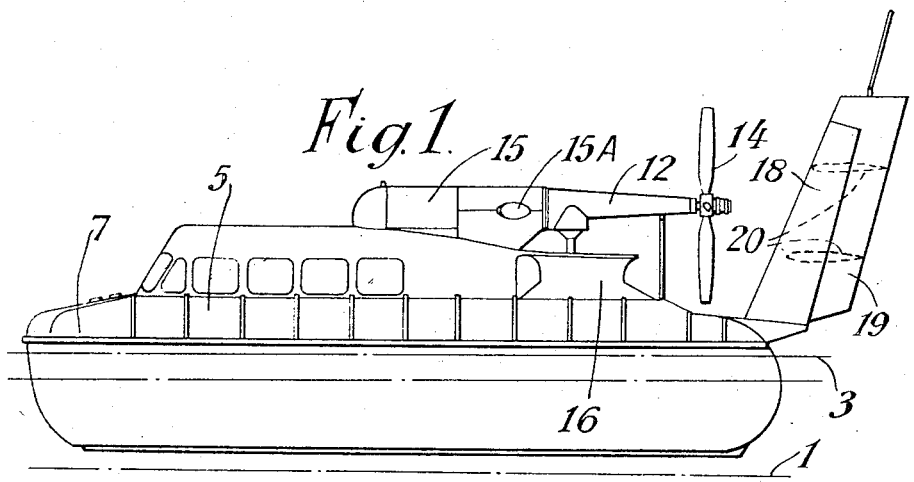

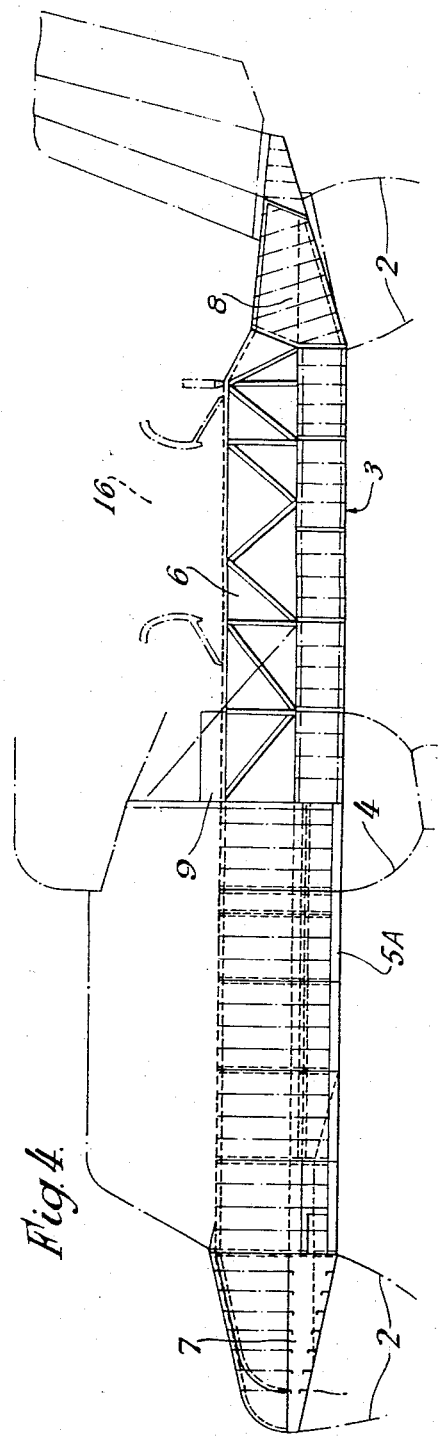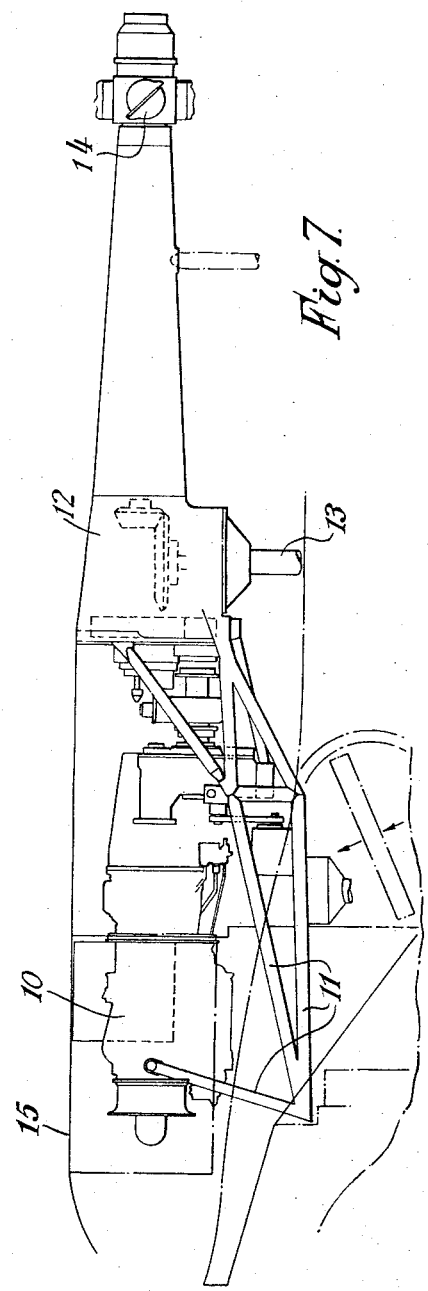

Jan. 23, 1968     D. J. HARDY ET AL     3,365,017
GROUND EFFECT VEHICLES
Filed Aug. 24, 1964     5 Sheets-Sheet 3
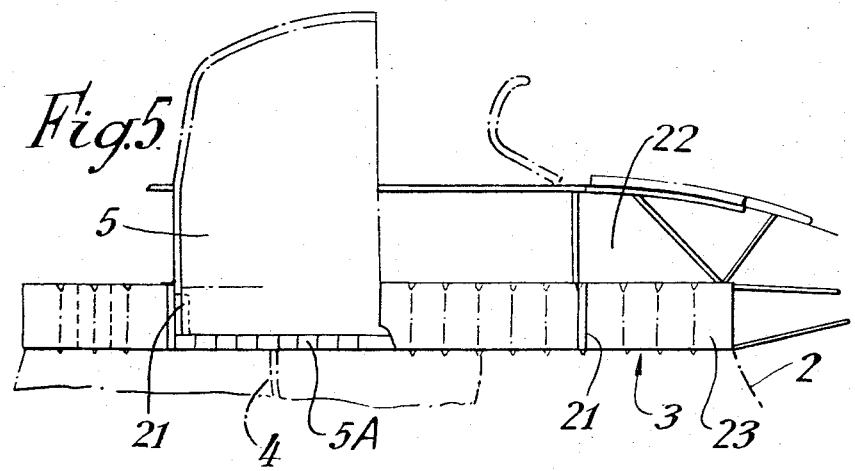
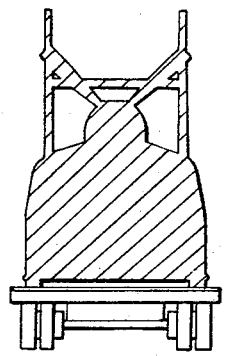

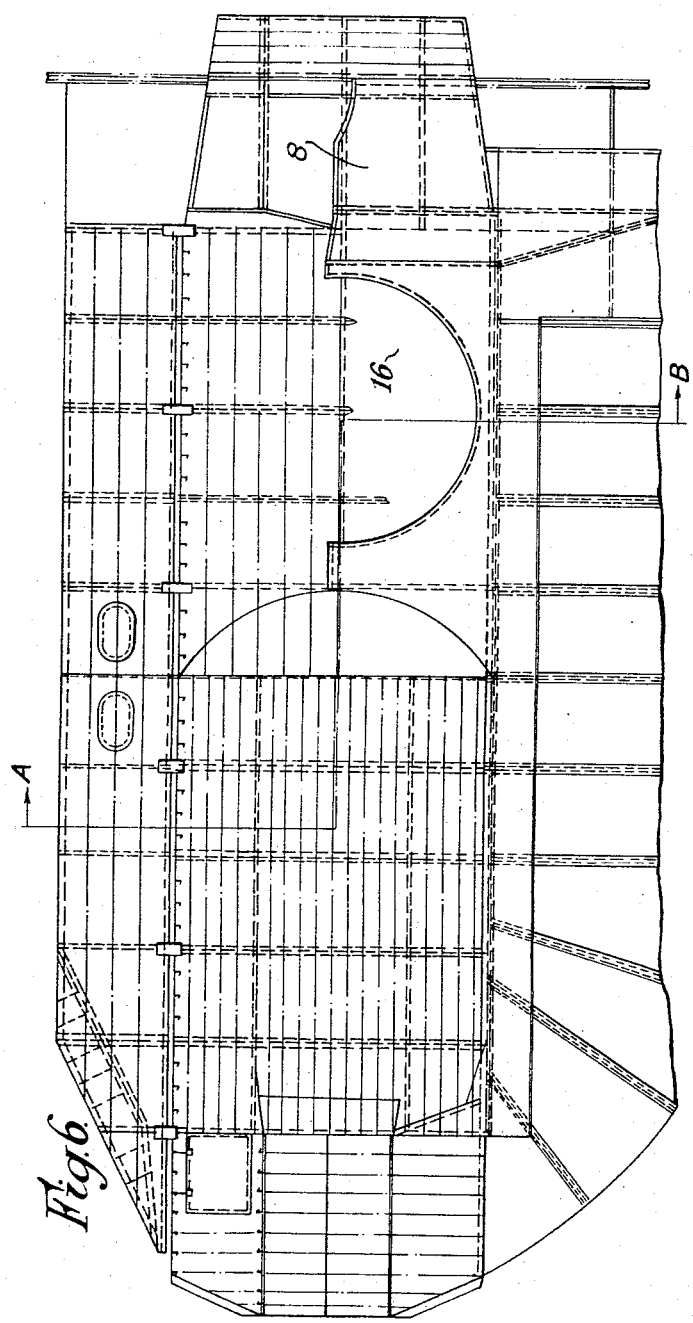

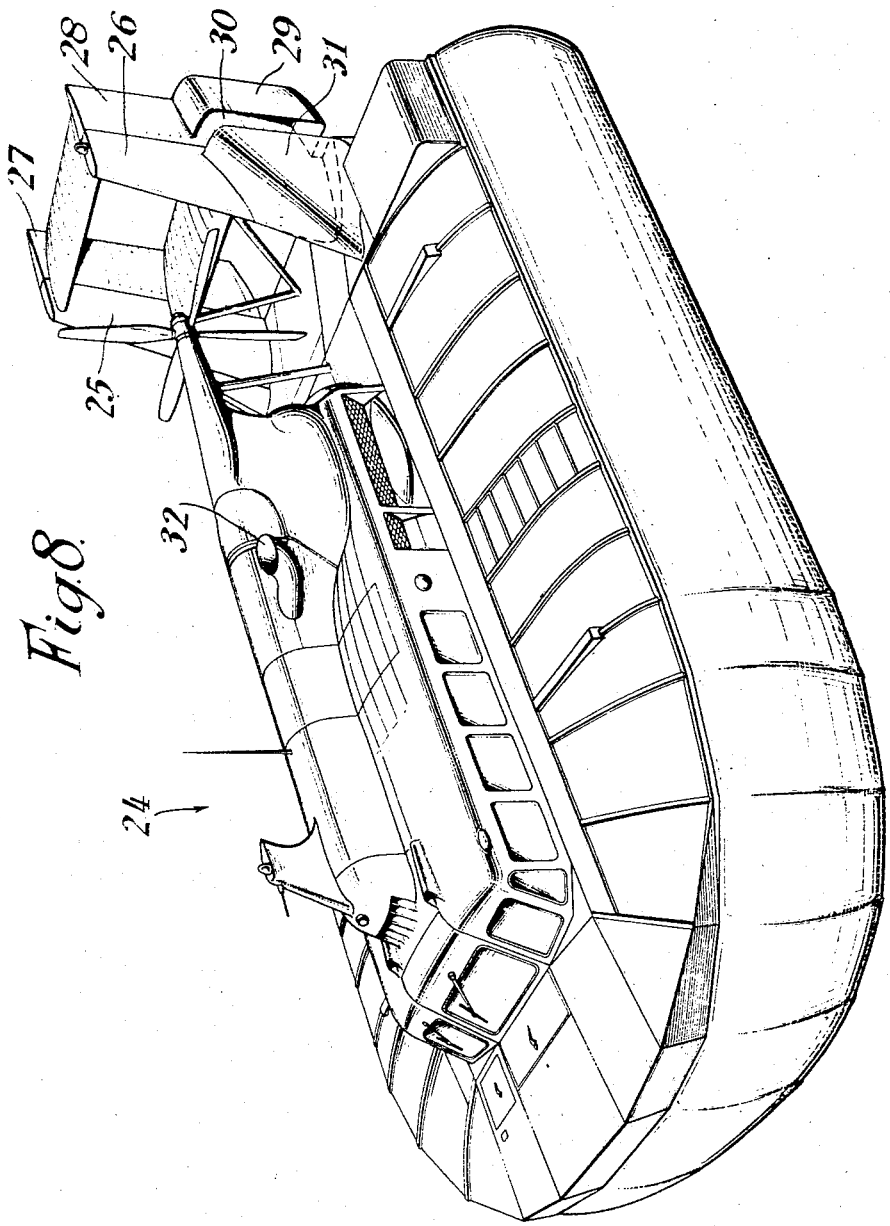

A United States Patent Office 3,365,017
Patented Jan. 23, 1968

3,365,017
GROUND EFFECT VEHICLES
Derek J. Hardy, Cowes, Isle of Wight, England, and Alexander W. Prickett, East Cowes, Isle of Wight, England, assignors to Westland Aircraft Limited, Yeovil, England
Filed Aug. 24, 1964, Ser. No. 391,373
Claims priority, application Great Britain, Aug. 30, 1963, 34,331/63; July 22, 1964, 29,623/64
3 Claims. (Cl. 180—117)

This invention relates to ground effect vehicles of amphibious character. It affords an arrangement and features which collectively have substantial advantages over existing examples of such vehicles. Among such advantages are transportability, versatility of use, good maneuverability when cushion borne over land or water, good protection against ingress of water to the power plant, a compact and unitary power plant arrangement, low placed air intake which is conducive to low momentum-drag and, therefore, is not conducive to setting up rolling moments, a low centre of gravity, low loading, shallow draft with adequate seakeeping qualities when afloat. Further, what may be called the "working space" of the vehicle, defined for the purposes of this specification and claims as the space containing the driver's post, cabin or hold, and fuel accommodation, comprises a structural unit that can be transported by road or air, whilst the remainder of the structure can be fabricated in the form of detachable units. As will be demonstrated below, a vehicle of very useful dimensions can be housed for transport, within an existing freight aeroplane. Yet another advantage offered by the invention is that the main power plant, its transmission mechanism, and the single lift-fan and a single controllable airscrew, both of which it drives, can be constituted as a unit which can, therefore, be separately assembled and tested, installed as a whole unit if required, and is yet compact, light and economic.

The foregoing advantages result from a ground effect vehicle comprising basically a virtually self-contained core structure comprising the working space above mentioned, additional structure attachable thereto to afford a buoyant platform and plenum chamber which carries peripherally a retractable or collapsible skirt, a power plant comprising an engine (which may be a single engine or a multiple group) housed in a pod and supported by structure rising from the core structure and driving both a controllable airscrew and a lift-fan, and an aerodynamic rudder or rudders preferably associated with one or more aerodynamic elevators, which are supported by the core structure in the airscrew stream.

Preferably such a vehicle has a bow access companionway giving almost direct access to the cabin and provided with a ramp which can be quite shallow in slope, because the static height of the vehicle, be it groundborne or waterborne, is exceptionally small. The vehicle has in its most favoured embodiment, an air intake located aft of a break in its top deck or cabin-top, where it is to some extent sheltered; this location, moreover, is aft of the engine and forward of the airscrew, this apparently simple feature affording the practical advantage that the lift fan, in the air intake, is driven simply by a vertical shaft geared to the airscrew shaft, no universal joints being needed. An important feature of the invention is that the vehicle is built around an integrated propulsion system comprising a single lift-fan and a single airscrew, both driven from the same power plant.

The immediate-above arrangement yields a further considerable advantage, in that the engine-air intake may now be arranged in the cabin-top break mentioned above, i.e., so that it faces aft, whilst the short circular upstanding projection of the lift-air intake forms a fair passage-wall for the engine-air. As will become clearer hereinafter, all the air entry is located relatively low, thus minimising rolling moments known to be caused by momentum-drag of such entries. Moreover, this arrangement in turn facilitates the provision of suitable mesh or other screening, to remove water or solid foreign matter from the engine intake air.

The invention also seeks to overcome certain difficulties which have been found in earlier vehicles in connection with yaw stability and control at low speeds.

According to this feature of the invention, air from the plenum chamber is bled off and led through ducting, so as to act on the fin or fins of the vehicle. This air may be ducted so as to act upon one or more fins or alternatively it may be shut off entirely by means of suitable valves.

The invention will now be described by way of example with reference to the accompanying diagrammatic and perspective drawings. This example is that of a general-use passenger-carrying vehicle, and it will assist understanding to appreciate that it relates to a vehicle having general particulars approximately as follows: all-up weight 7 tons, payload 2 tons, length 38 feet, beam 22.5 feet, height (to fin) 15 feet, power 900 H.P., endurance 3 hours, maximum cruise speed 73 knots, obstacle clearance (rigid obstacle) 4 feet.

The foregoing is desirable to be understood, for it will be shown how such a vehicle can be dismantled into units so as to be transportable on a 7-ton road truck.

Figure 2:
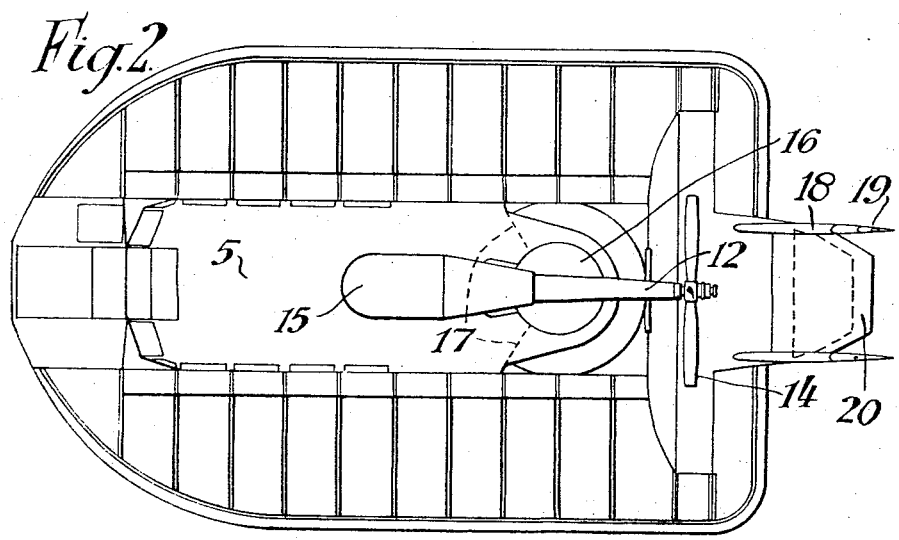

In the drawings:
FIGURE 1 is a side elevation of the vehicle.
FIGURE 2 is a plan of the same, and
FIGURE 3 a bow end elevation.
FIGURE 4 is a side sectional elevation and
FIGURE 5 is a half section on the line A–B of FIGURE 6.
FIGURE 6 is a plan view of FIGURE 4 with superstructure removed.
FIGURE 7, on enlarged scale, shows in side elevation some detail of the engine and transmission unit.
FIGURE 8 shows the vehicle incorporating important features of the invention.
FIGURE 9 represents schematically, a breakdown for road transport.

Figure 3:
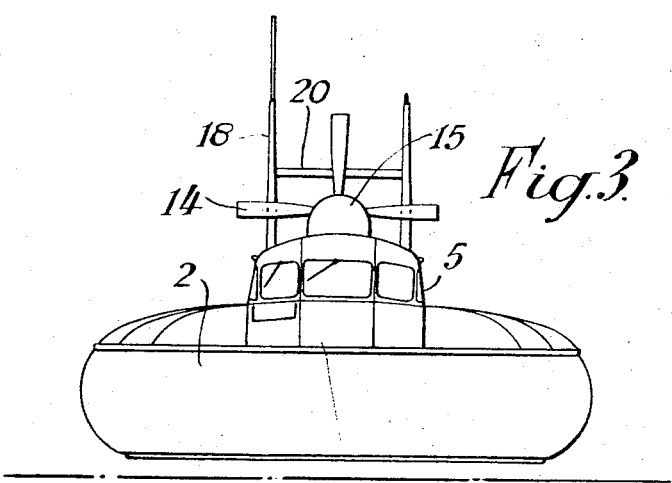

The general form of the vehicle is seen in FIGURES 1, 2 and 3, where it is shown airborne in relation to a ground line at 1. Insulated collapsible skirting is shown at 2, this being peripheral. When the skirting 2 is collapsed or retracted, the static ground line is effective at 3. The configuration seen in FIGURE 4 shows the skirt arrangement more clearly. As well as the peripheral skirting 2, the cushion chamber is preferably equipped with inflatable stabilisers, indicated at 4 in FIGURES 4 and 5.

The core structure of the vehicle comprises the cabin 5, aft of which is a plenum section 6, bow-decking 7 and stern-decking 8, these latter being buoyant. The floor or deck 5A of the cabin 5 corresponds to the flat bottom of the vehicle as a whole.

The core structure carries fuel tankage at 9, near the centre of gravity. It also carries an engine 10 (FIGURE 7) supported on a suitably triangulated bearer structure 11 which by a rearward cantilever overhung part, also carries a transmission housing generally shown at 12, which includes a bevel gear drive to a single vertical lift-fan shaft 13 and suitable bearings including thrust bearings, for the single controllable airscrew 14. Thus the engine 10 drives both the lift-fan and the airscrew.

The engine 10 (preferably of the free-turbine gas turbine type) is podded within a well sealed pod 15, and it exhausts to atmosphere, e.g. by outlets 15A. Aft of the engine bearer system 11, is a lift-air intake 16. This is of conventional convergent-divergent form and leads into the plenum section 6, and in it is the lift-air fan, not shown. It will be noted that the entry part of the intake 16 projects proud of the top deck of the structure, at its location. Forward of the intake 16 and in the after break of the cabin superstructure, are two engine-air intakes, indicated at 17 in FIGURE 2. These face basically aft, and it will be seen that air reaches them around the unbroken contour of the proud part of the intake 16. These intakes 16 may also serve to supply cabin air, which may be conditioned as required. Their location is such as to minimise the entry of water or of foreign bodies. It will also be noted that the lift-air intake and the engine-air intake are located relatively low. The ducting of the intakes 17 to the interior of the pod 15 preferably includes filtration or separation means, selected to reduce the ingress of water; consequently some form of water drain may be provided.

Behind, and close in the slipstream of, the airscrew 14 is a double fin and rudder, and elevator arrangement with fins 18, rudders 19 and elevators (or movable tailplanes) 20, all of which are aerodynamic in effect. The empennage so formed is carried by the core structure, and may be detachable as a unit.

The foregoing shows that the core structure forms virtually a constructional unit with the power plant and the empennage as self-contained sub-units.

To the sides of the core unit are attached platform structures, best seen in FIGURE 5. These each comprise an upper space 22, which connects to the plenum section 6 and forms a continuation thereof, and a platform part 23 which is constructed to be buoyant, being cellular, or filled with a buoyancy material. The outside margin of each of these side structures is tapered (see FIGURE 5) and the profile so formed may serve to stow the skirting 2 when retracted, above the flat bottom surface of the vehicle, which corresponds to the line 3 of the drawings. Thus each lateral portion may constitute a complete unit which, when assembled to the core structure (as at the locations 21, FIGURE 5) complete the plan form of the vehicle and functionally connect with it, in so far as the plenum chamber is made continuous, to be supplied by the intake 16, and the skirting, whether fabricated as one unit and attached to the platform of the vehicle as a whole, or whether made in sections permanently attached to the lateral portions, the bow deck 7 and stern deck 8, respectively.

It will be observed that, viewing the structure as a whole (and as best indicated by FIGURE 5) the working accommodation being recessed into the effective depth of the platform, is located with its centre of gravity as low as may be.

Referring now to FIGURE 8, a ground effect vehicle is generally illustrated in perspective by the reference numeral 24. The vehicle has twin fins 25 and 26 and twin rudders 27 and 28. Each rudder carries an auxiliary surface, one of which is shown at 29. The auxiliary surface may be so formed as to act with an injector effect, entraining air into a space 30. The surface is so shaped and attached as to form this space between itself and the rudder 28. A duct 31 conducts air from the plenum chamber of the vehicle so that the air is blown through the space 30 and is deflected by movement of the rudder 28. There is a similar arrangement on the other side of the vehicle.

In another embodiment of the invention the ducted air is controlled by means of valves actuated by the rudders 27 and 28.

Means similar to the ducts and surfaces may be applied to the horizontal tail surfaces.

A further feature of the vehicle is that the engine exhaust is directed upwards through nozzles, one of which is shown at 32. These nozzles may be arranged so as to swivel if desired, and this further feature of control may especially be used for purposes of trimming the craft.

FIGURE 9 indicates that the core structure (in the case of the dimensions of the example described) which is shown as a section, will fit on a road truck. It is shown with the engine and empennage sub-units still assembled, but these may, of course, be dismantled and stowed in a lower manner. There is room for the two side structures to be packed on the same vehicle, within permissible loading dimensions.

We claim:
1. A ground effect vehicle comprising:
a core structure forming a plenum chamber, a power plant mounted on said core structure, an airscrew driven by said power plant to provide an air stream to propel said vehicle, a lift-fan driven by said power plant to provide a stream of air through said plenum chamber to in turn form a supporting air cushion to lift said vehicle, a controllable movable aerofoil surface mounted on said core structure for controlling said vehicle and having at least part of said surface located in said propelling air stream, an auxiliary member mounted on said movable aerofoil surface for movement therewith, said auxiliary member defining with a part of said aerofoil surface a duct-like passage extending along said aerofoil in the general fore-and-aft direction of the vehicle, and a stationary duct leading from said plenum chamber to a point adjacent a part of said aerofoil surface and substantially in alignment with said duct-like passage so that a portion of the pressurized air in said plenum chamber is ducted to flow along the aerofoil surface and through said duct-like passage to provide auxiliary control for said vehicle.

2. A ground effect vehicle according to claim 1 in which platform structures are mounted to extend laterally from said core structure and a skirt is mounted to depend from said platform structures.

3. A ground effect vehicle as claimed in claim 1 wherein said movable aerofoil surface is a rudder.

References Cited
UNITED STATES PATENTS

| | | | |
|---|---|---|---|
| 3,056,258 | 10/1962 | Marchant et al. | 244—52 X |
| 3,208,543 | 9/1965 | Crowley | 180—7 |
| 3,262,510 | 7/1966 | Froehler | 180—7 |

OTHER REFERENCES

SR–N5 Hovercraft, "Basic Layout," pages 4 and 5, "Design Features," page 9, April 1963.

A. HARRY LEVY, *Primary Examiner.*

BENJAMIN HERSH, *Examiner.*

M. S. SALES, *Assistant Examiner.*